(12) United States Patent
Kimura et al.

(10) Patent No.: US 12,534,164 B2
(45) Date of Patent: Jan. 27, 2026

(54) ENERGY COLLECTION LOCATION CHANGING SYSTEM

(71) Applicant: TOYOTA JIDOSHA KABUSHIKI KAISHA, Toyota (JP)

(72) Inventors: Kazutaka Kimura, Mishima (JP); Hiroyuki Nakatani, Gotemba (JP); Masahiro Takahashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/948,985

(22) Filed: Nov. 15, 2024

(65) Prior Publication Data

US 2025/0242895 A1     Jul. 31, 2025

(30) Foreign Application Priority Data

Jan. 31, 2024   (JP) .................. 2024-012781

(51) Int. Cl.
*B63B 35/00*    (2020.01)
*B63B 35/44*    (2006.01)
*B63B 79/40*    (2020.01)

(52) U.S. Cl.
CPC .............. *B63B 35/44* (2013.01); *B63B 79/40* (2020.01); *B63B 2035/446* (2013.01)

(58) Field of Classification Search
CPC ... B63B 35/44; B63B 79/40; B63B 2035/446; B63B 2213/02; H02K 7/183
See application file for complete search history.

(56) References Cited

U.S. PATENT DOCUMENTS

2012/0242275 A1*  9/2012  Kokusho ................ H02S 20/00
                                                    136/246

FOREIGN PATENT DOCUMENTS

JP        2015115987 A   *   6/2015
JP        2020-037360 A      3/2020

* cited by examiner

*Primary Examiner* — Julio C. Gonzalez
(74) *Attorney, Agent, or Firm* — SoraIP, Inc.

(57) ABSTRACT

In the energy collection location changing system, a power generation floating body and a collection station setting system are provided so as to be able to perform data communication with each other. The power generation floating body has a power generation storage unit for storing the power generation energy and a navigation unit for navigation of the own base, and the collection station setting system has a location determination unit for determining a recovery position in which the collection station is provided based on at least one of a wind condition and a sea condition, a location notification unit for notifying the recovery position to each of the power generation floating bodies, and a setting unit for providing the collection station in the recovery position, and the navigation unit of the power generation floating body causes the own base to travel to the recovery position.

9 Claims, 11 Drawing Sheets

ENERGY COLLECTION LOCATION CHANGING SYSTEM

CROSS-REFERENCE TO RELATED APPLICATION

This application claims priority to Japanese Patent Application No. 2024-012781 filed on Jan. 31, 2024, incorporated herein by reference in its entirety.

BACKGROUND

1. Technical Field

The present disclosure relates to an energy transfer system that transfers electric energy obtained by a power generation floating body that floats on a water surface.

2. Description of Related Art

When supplying fuel (i.e., energy) to a vessel navigating a large area such as the ocean, an energy transfer tube connected to a land energy base cannot be used. As an energy transfer method in such a case, there is known a method in which an energy supply vessel and an energy receiving vessel are moored to each other and energy is transferred by connecting manifold pipes of the respective vessels with hoses (see, for example, Japanese Unexamined Patent Application Publication No. 2020-037360 (JP 2020-037360 A)).

SUMMARY

However, the above method is inefficient because, when there is a plurality of energy receiving vessels, the energy supply vessel needs to sail to each of the energy receiving vessels. Further, there are various technical problems that, for example, there is no mention about setting of a rendezvous location of an energy-collecting side and an energy-collected side in consideration of efficiency.

An object of the present disclosure is to provide an energy collection location changing system that enables efficient energy collection from a plurality of power generation floating bodies.

An energy collection location changing system according to one aspect of the present disclosure includes: a power generation floating body configured to navigate a water surface and generate electric power using renewable energy; and a collection station setting system configured to provide a collection station for collection of generated energy from at least part of a power generation floating body group including the power generation floating bodies.

The power generation floating body and the collection station setting system are configured to perform data communication with each other.

The power generation floating body includes:
a power generation storage unit configured to store the generated energy by a predetermined storage method; and
a navigation unit configured to cause the power generation floating body to navigate to a predetermined destination.

The collection station setting system includes:
a location determination unit configured to determine a collection location where the collection station is to be provided based on at least one of a wind condition and a sea condition in a predetermined region including the power generation floating body group; a location notification unit configured to notify at least part of the power generation floating body group about location information indicating the determined collection location; and a setting unit configured to provide the collection station at the determined collection location.

The navigation unit of the power generation floating body is configured to, when the location information is acquired, cause the power generation floating body to navigate to the determined collection location.

In the energy collection location changing system according to the one aspect of the present disclosure, the collection location is determined based on at least one of the wind condition and the sea condition when collecting the generated energy from the power generation floating bodies. Thus, efficient energy collection can be realized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment

A first embodiment of an energy collection location changing system according to the present disclosure will be described with reference to FIGS. 1 to 8.

Energy Collection Location Changing System

First, each configuration in the energy collection location changing system 1 according to the first embodiment will be described with reference to FIGS. 1 to 5. As shown in FIG.

1, in the energy collection location changing system 1 according to the present disclosure, the power generation floating body group PG and the collection station setting system 200 are provided so as to be capable of data communication with each other. The power generation floating body group PG includes a plurality of power generation floating bodies 100. Each of the plurality of power generation floating bodies 100 is configured to be able to navigate on the water surface of the sea, the river, the lake, or the like in a fleet. The configuration of each power generation floating body 100 may be the same. For example, a floating body ID for identifying each power generation floating body 100 may be provided to each power generation floating body 100. The energy collection location changing system 1 may be configured to identify the respective power generation floating body 100 by the floating body ID. Hereinafter, when it is not necessary to identify the respective power generation floating bodies 100, they are collectively referred to as "power generation floating bodies 100".

Figure 1:
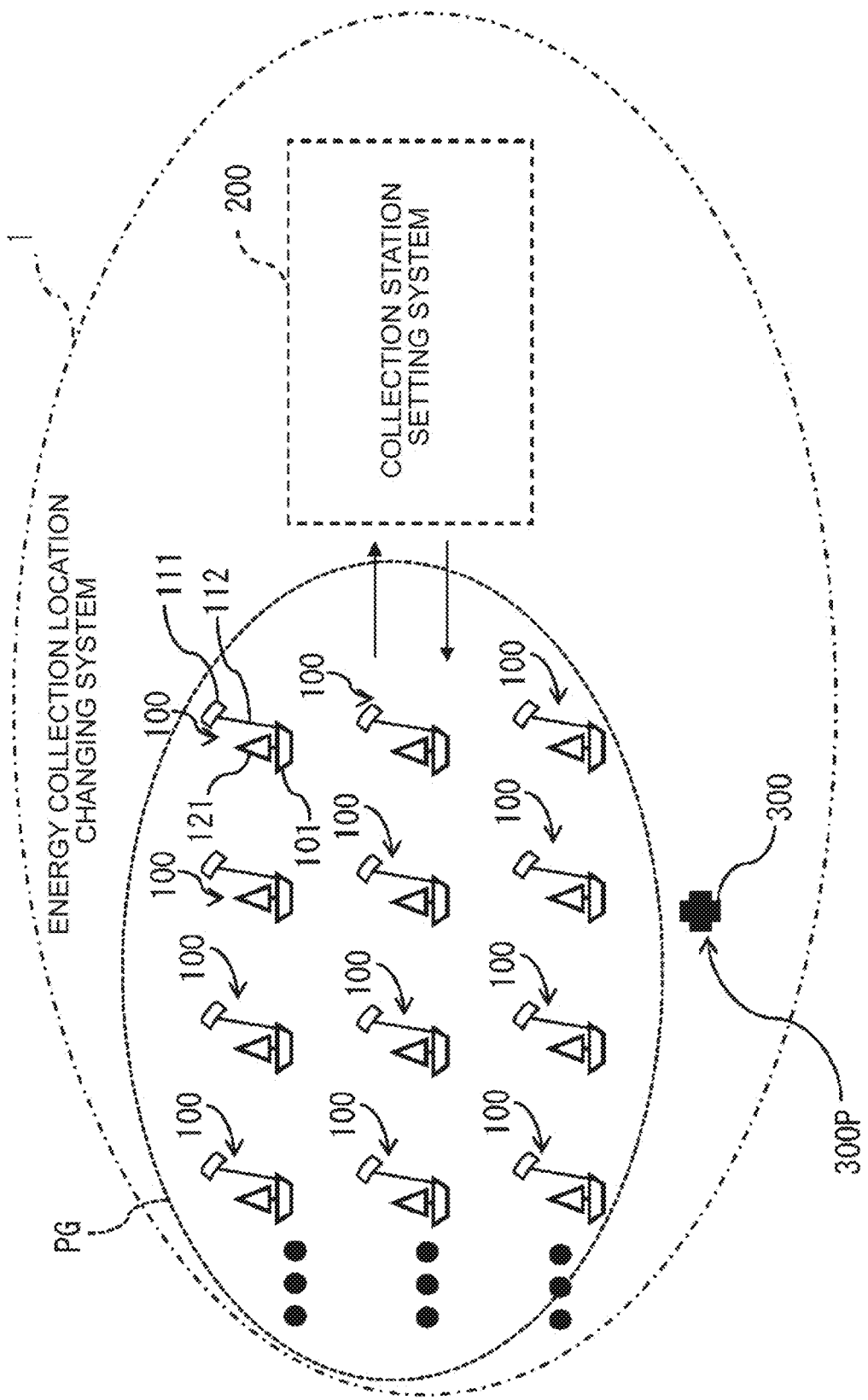
FIG. 1 is a schematic configuration diagram illustrating an example of an energy collection location changing system.

The power generation floating body 100 in the present embodiment may be, for example, a sailing ship type floating body capable of navigating the sea. The power generation floating body 100 may be configured to be capable of navigating (i.e., sailing) the sea using, for example, wind energy received in the sail 121 as a power source. In the power generation floating body 100, power generation using renewable energy may be performed. In the power generation floating body 100, as illustrated in FIG. 1, as an example, wind power generation using the kite 111 connected to the hull 101 via the tether 112 may be performed.

The electric power generated by the power generation floating body group PG on the sea may be recovered at a collection station 300 provided on the sea so as to be recovered on the sea. Collection station 300 may be, for example, a mobile body that is non-moored and moveable over or under the sea. As described above, the energy collection location changing system 1 is configured such that the recovery vessel that recovers the power generation energy does not need to turn the respective power generation floating bodies 100 for the energy recovery. The collection station setting system 200 in the energy collection location changing system 1 is configured such that the position of the collection station 300 (hereinafter, referred to as "recovery position") changes in consideration of the situation at the time of recovery. In FIG. 1, a collection station 300 is shown as being provided in the collection position 300P. Hereinafter, the configurations of the power generation floating body 100, the collection station 300, and the collection station setting system 200 will be described.

Configuration of the Power Generation Floating Body

Figure 2:
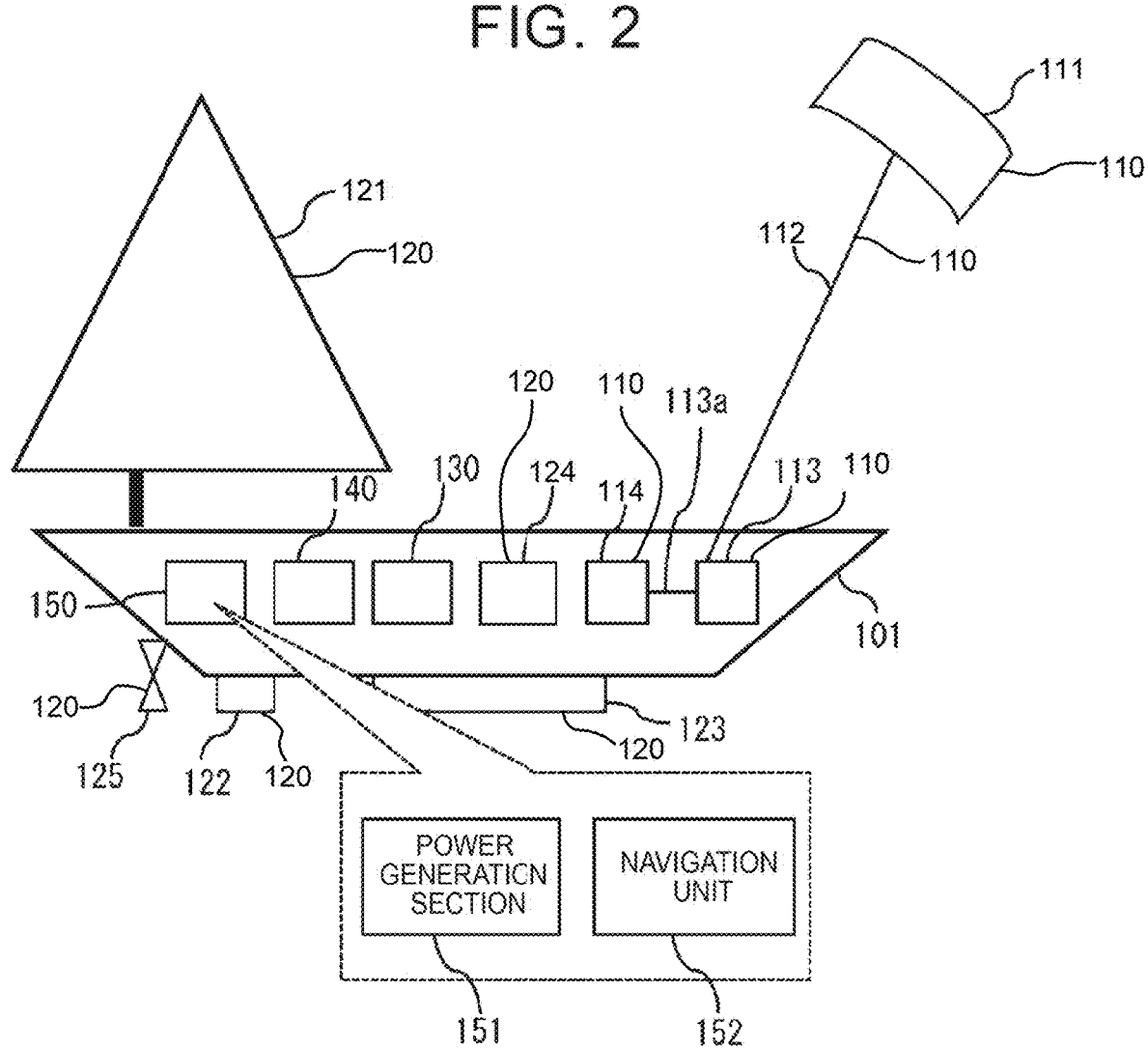
FIG. 2 is a schematic configuration diagram illustrating an example of a power generation floating body.

The configuration of the power generation floating body 100 will be described with reference to FIG. 2. As described above, the floating body ID for identifying each of the power generation floating bodies 100 may be provided to each of the power generation floating bodies 100. As an example, as shown in FIG. 2, the power generation floating body 100 may include a power generation mechanism 110, a navigation mechanism 120, a power generation storage mechanism 130, a floating body communication mechanism 140, and a floating body control device 150.

The power generation mechanism 110 may include a plurality of elements utilized for wind power generation. The power generation mechanism 110 may include, for example, the tether 112 and the kite 111 described above, as well as the winch 113 and the generator 114. The winch 113 has a rotating shaft body 113a as a rotating shaft, and the rotating shaft body 113a is connected to a rotating shaft of the generator 114. A tether 112 is wound around the rotating shaft body 113a. When the kite 111 is raised, the tether 112 is unwound from the winch 113 as the kite is raised. The rotating shaft body 113a is rotated by the feeding-out operation of the tether 112. The rotation shaft of the generator 114 rotates in conjunction with the rotation when the kite 111 moves upward, thereby generating electric power. Further, when the rotating shaft body 113a rotates in the winding direction of the tether 112, the tether 112 is collected and the kite 111 is lowered. When the tether 112 is collected, the generator 114 may rotate the rotating shaft body 113a based on a command from the floating body control device 150.

The navigation mechanism 120 may include a plurality of elements for causing the power generation floating body 100 to navigate over the sea. The navigation mechanism 120 may be provided with, for example, a sail 121 that allows sailing by wind, a rudder 122 that determines the direction of the hull 101, and a center board 123 that generates a lateral force. In addition to the movement by wind power, the power generation floating body 100 may include, for example, a propeller 125 and a motor 124 as a power source as the navigation mechanism 120 so as to be able to move by electric power. For example, electricity generated by the power generation mechanism 110 may be used to drive the motor 124. Further, the navigation mechanism 120 may include sensors. The sensors may include, for example, a wind direction wind speed sensor, an acceleration sensor, an angular velocity sensor, a velocity sensor, and the like.

The power generation storage mechanism 130 may be configured to store the power generation energy generated by the power generation mechanism 110 in a predetermined manner. In this embodiment, the power generation storage mechanism 130 may store the power generation energy in the form of a hydrogen storage alloy tank, for example. In this case, the power generation storage mechanism 130 may be configured to decompose water by the power generation energy obtained by the power generation mechanism 110 to convert the water into hydrogen, and absorb the obtained hydrogen in the hydrogen storage alloy tank. The power generation storage mechanism 130 may store a plurality of hydrogen storage alloy tanks. The power generation storage mechanism 130 may be configured, for example, such that the power generation energy appropriately monitors the storage amount stored in the power generation storage mechanism 130. The power generation storage mechanism 130 may be configured such that, for example, a storage rate (a stored amount with respect to a storage allowable amount of the power generation storage mechanism 130) can be calculated as appropriate.

The floating body communication mechanism 140 may be configured to enable wireless communication with the outside of the power generation floating body 100. For example, "external" may be inside or outside the energy collection location changing system 1. "External" may include, for example, other power generation floating bodies 100, collection station setting systems 200, collection stations 300, and the like. The "external" may further include a provider of various kinds of information necessary for various kinds of processing in the power generation floating body 100, and the like. For example, the floating body communication mechanism 140 may be configured to be capable of acquiring various types of positional information from a device GNN (Global Navigation Satellite System), a device GPS (Global Positioning System), or the like in order to acquire the positional information of its own base. The various types of information sent to the outside via the floating body communication mechanism 140 may include the floating body ID of the own base as appropriate. For example, the floating body communication mechanism 140 may transmit the position information of the own base including the floating body ID to the other power generation floating body 100 so as to be received.

The floating body control device 150 controls various kinds of processing in the power generation floating body 100. The floating body control device 150 may be configured as a control unit including, for example, a CPU (Central Processing Unit) and a storage device, an input/output interface, and the like required for the operation of CPU. The storage device may include, for example, ROM (Read Only Memory), RAM (Random Access Memory), and data storage. The floating body control device 150 may be connected to the respective mechanisms 110, 120, 130, and 140 by a data path, for example, via an input/output interface. The floating body control device 150 may control various operations by the respective mechanisms 110, 120, 130, and 140. In ROM, for example, the floating body ID of the self-substrate may be held.

ROM may store, for example, a computer program for implementing a process in the floating body control device 150. The floating body control device 150 may read a computer program stored in a ROM or data storage. Alternatively, the floating body control device 150 may acquire (i.e., download) a computer program from a device (not shown) disposed outside the energy collection location changing system 1 via the floating body communication mechanism 140, and read the acquired computer program. The floating body control device 150 executes the read computer program. As a result, a logical functional block for controlling the operation of the power generation floating body 100 is realized in the floating body control device 150. FIG. 2 illustrates an example of logical functional blocks implemented in the floating body control device 150. In the example illustrated in FIG. 2, a power generation unit 151 and a navigation unit 152 are realized in the floating body control device 150.

The power generation unit 151 controls the operation of each element of the power generation mechanism 110. For example, the power generation unit 151 may control the position of the kite 111 by controlling the power generation mechanism 110. The power generation mechanism 110 may be controlled to repeat the two modes of the power generation mode and the recovery mode by controlling the position of the kite 111. The power generation mode is a mode in which power generation is performed. In the present embodiment, in the power generation mode, wind power generation is performed by raising the kite 111. For example, in the power generation mode, the power generation mechanism 110 may be controlled such that the tether 112 is unwound from the winch 113 to raise the kite 111. When the kite 111 reaches a predetermined height, for example, the power generation mechanism 110 may be controlled such that the kite 111 draws a character of 8. The retrieval mode is a mode in which the tether 112 is retrieved. In this embodiment, in the retrieval mode, the tether 112 is retrieved to lower the kite 111. For example, in the recovery mode, the power generation mechanism 110 may be controlled such that the tether 112 is wound onto the winch 113. Note that the power generation in the power generation mode and the recovery of the tether 112 in the recovery mode may be performed while the power generation floating body 100 is navigated in order to increase the power generation efficiency, as will be described later.

The navigation unit 152 automatically controls the movement (i.e., navigation) of the own base at sea by controlling the operation of each element of the navigation mechanism 120. For example, the navigation unit 152 may control the rudder 122 according to the traveling direction on the basis of sensor information from various sensors so that its own base moves in a predetermined route, and may control the angle of the sail 121 according to the wind direction. The navigation unit 152 may, for example, receive positional information transmitted from another power generation floating body 100 and control a distance from another power generation floating body 100. For example, the navigation unit 152 of the parent base of the power generation floating body group PG may receive the position data of the other power generation floating bodies 100 and control the positions of the power generation floating bodies 100. Further, the navigation unit 152 may determine a route on which the power generation floating body 100 moves based on at least one of wind conditions and sea conditions, for example.

Figure 3A:
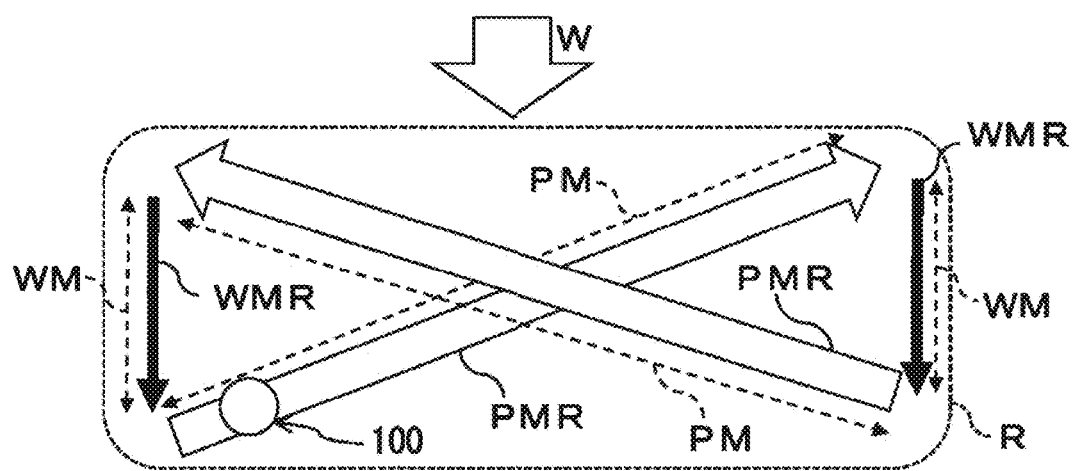
FIG. 3A is a diagram illustrating an example of a route of a power generation floating body according to a first embodiment.

The route of the power generation floating body 100 may be set so that the power generation mode PM and the recovery mode WM are alternately repeated within the predetermined region R, for example, as shown in FIG. 3A. In the power generation mode PM, for example, the power generation floating body 100 may perform power generation while moving while receiving the natural wind W to the side of the hull 101. In the recovery-mode WM, the power generation floating body 100 may recover the tether 112 while moving downward with respect to the natural wind W, for example. In the route of the power generation floating body 100, the time required for the power generation mode PM may be set longer than the time required for the recovery mode WM so that the power generation amount by the power generation mode PM is larger than the power amount consumed by the recovery mode WM. The route corresponding to the power generation mode PM is referred to as a power generation mode route PMR. The power generation mode route PMR is a route in which the power generation floating body 100 moves in the power generation mode PM. The route corresponding to the recovery mode WM is referred to as a collection mode route WMR. The collection mode route WMR is a route in which the power generation floating body 100 moves in the recovery mode WM.

In the embodiment shown in FIG. 3A, the power generation mode route PMR and the collection mode route WMR are set so that the power generation floating body 100 repeatedly draws 8 characters in the region R. The range and the position of the region R corresponding to each of the plurality of power generation floating bodies 100 may be set as appropriate, for example, such that a distance to the extent that the tethers 112 of each power generation floating body 100 are not entangled with each other is secured. In addition, when the region R is sufficiently large, the plurality of power generation floating bodies 100 may move in the route PMR, WMR in one region R.

Figure 3B:
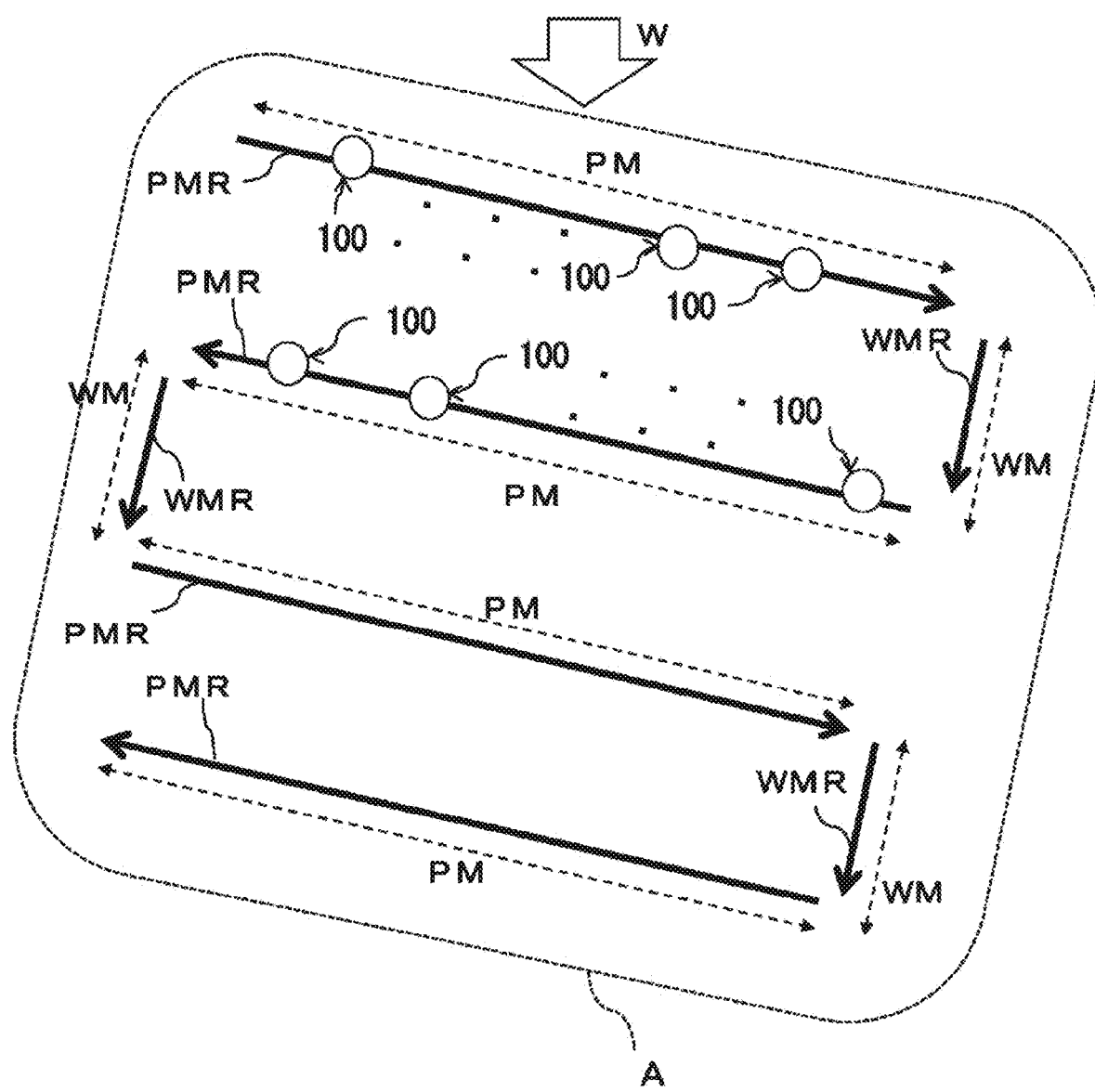
FIG. 3B is a diagram illustrating another example pf a route of a power generation floating body according to a first embodiment.

In addition, the route of the power generation floating body 100 may be set such that the power generation mode PM and the recovery mode WM are alternately repeated, for example, as shown in FIG. 3B, as in FIG. 3A. In the power generation mode PM, for example, the power generation floating body 100 may perform power generation while moving while receiving the natural wind W to the side of the hull 101. In the recovery-mode WM, the power generation floating body 100 may recover the tether 112 while moving downward with respect to the natural wind W, for example. In the route of the power generation floating body 100, the time required for the power generation mode PM may be set longer than the time required for the recovery mode WM so that the power generation amount by the power generation mode PM is larger than the power amount consumed by the recovery mode WM. The plurality of power generation floating bodies 100 may move on the traffic route in a state of being arranged in a row at a predetermined interval.

In the embodiment shown in FIG. 3B, in an region A in which the wind power of the natural wind W is suitable for wind power generation (that is, strong wind is blowing), the power generation mode route PMR corresponding to the power generation mode PM and the collection mode route WMR corresponding to the recovery mode WM are repeated. The range of the region A may be appropriately set. For example, the range of the region A may be set according to the wind condition. As an example, the range of the region A may be set so as not to enter the region where the wind force is weakened. Alternatively, the range of the region A may be appropriately changed by dynamically determining the range of the respective route PMR, WMR.

Composition of the Collection Station

Figure 4:
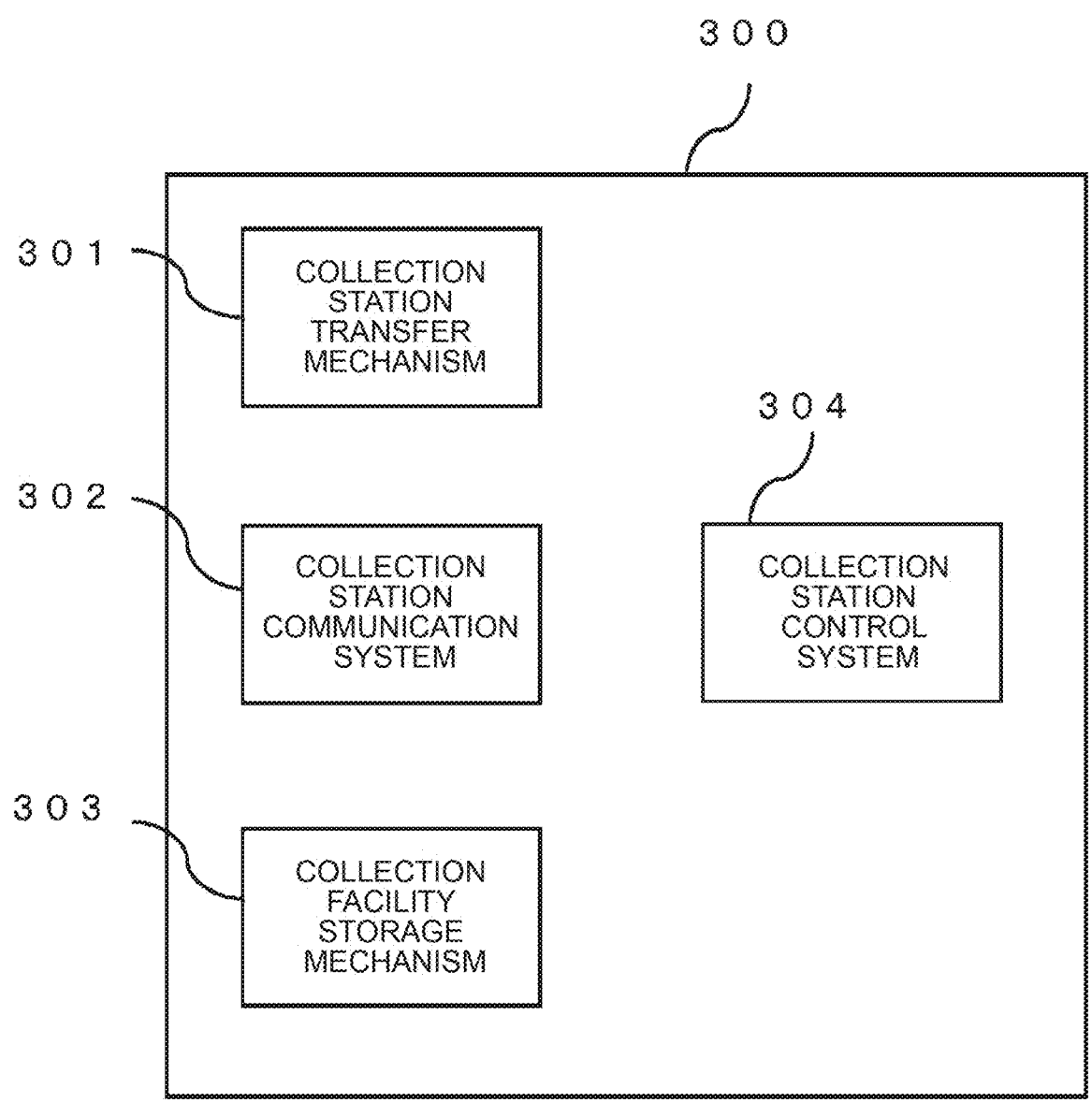
FIG. 4 is a schematic configuration diagram illustrating an example of a collection station.

The collection station 300 may be a water surface or an underwater movable vehicle as described above. As an example, as shown in FIG. 4, the collection station 300 may include a collection station moving mechanism 301 that moves the position of the collection station 300, a collection station communication mechanism 302 that enables wireless communication with the outside, a collection station storage mechanism 303 that recovers and stores power generation energy from the power generation floating body 100, and the like. The collection station moving mechanism 301 may include known propellers and known power sources to enable surface or underwater movement. Furthermore, the collection station moving mechanism 301 may include, for example, various sensors for obtaining information necessary for moving. The "outside" with which the collection station communication mechanism 302 can communicate may include, for example, a power generation floating body 100, a collection station setting system 200, a collection vessel, and the like. The collection station communication unit 302 may be configured to be capable of acquiring various types of positional information from a GNN device, a GPS device, or the like in order to acquire the positional information of its own base. The collection station storage mechanism 303 may be configured to acquire and store the electric power generation energy stored in a predetermined manner from the power generation floating body 100. The collection station storage mechanism 303 may include, for example, an acquisition mechanism such as an arm that acquires the electric power generation energy stored in a predetermined manner from the power generation floating body 100. The collection station storage mechanism 303 may be configured to store, for example, a hydrogen storage alloy tank obtained from the power generation floating body 100 in the sea or at sea.

Further, the collection station 300 may include a collection station control device 304 that controls various operations in the collection station 300. The collection station control device 304 may be configured as a control unit including, for example, a CPU and a storage device and an input/output interface required for its operation. The storage device may include ROM, RAM, data storage, and the like. The collection station control device 304 may be connected to each of the above-described mechanisms 301, 302, and 303 via an input/output interface via a data path. The collection station control device 304 may control various operations by the respective mechanisms 301, 302, and 303, for example, by a predetermined instruction and/or a predetermined trigger by a person. If there are a plurality of collection stations 300, a collection station ID for identifying each collection station 300 may be held in ROM. In such cases, the collection station communication unit 302 may include the collection station ID of its own base in various types of information to be transmitted.

The collection station 300 may be, for example, a recovery vessel having the above-described configuration. The recovery vessel is an energy transfer vessel that recovers power generation energy from the plurality of power generation floating bodies 100 and transfers the power generation energy to a predetermined destination (for example, land). The recovery vessel arrives at a recovery location 300P in order to recover the power generation energy from the power generation floating body 100. That is, the recovery position 300P may be a variable position at which the recovery vessel arrives. Alternatively, the collection station 300 may be, for example, a relay station having the above-described configuration. The relay station is a place where the power generation energy from the plurality of power generation floating bodies 100 is collected for the recovery ship. The recovery position 300P may be a variable position where a relay station is provided. The power generation energy recovered by the relay station may be appropriately recovered by the recovery vessel that arrived at the relay station.

Configuration of Collection Station Setting System

Figure 5:
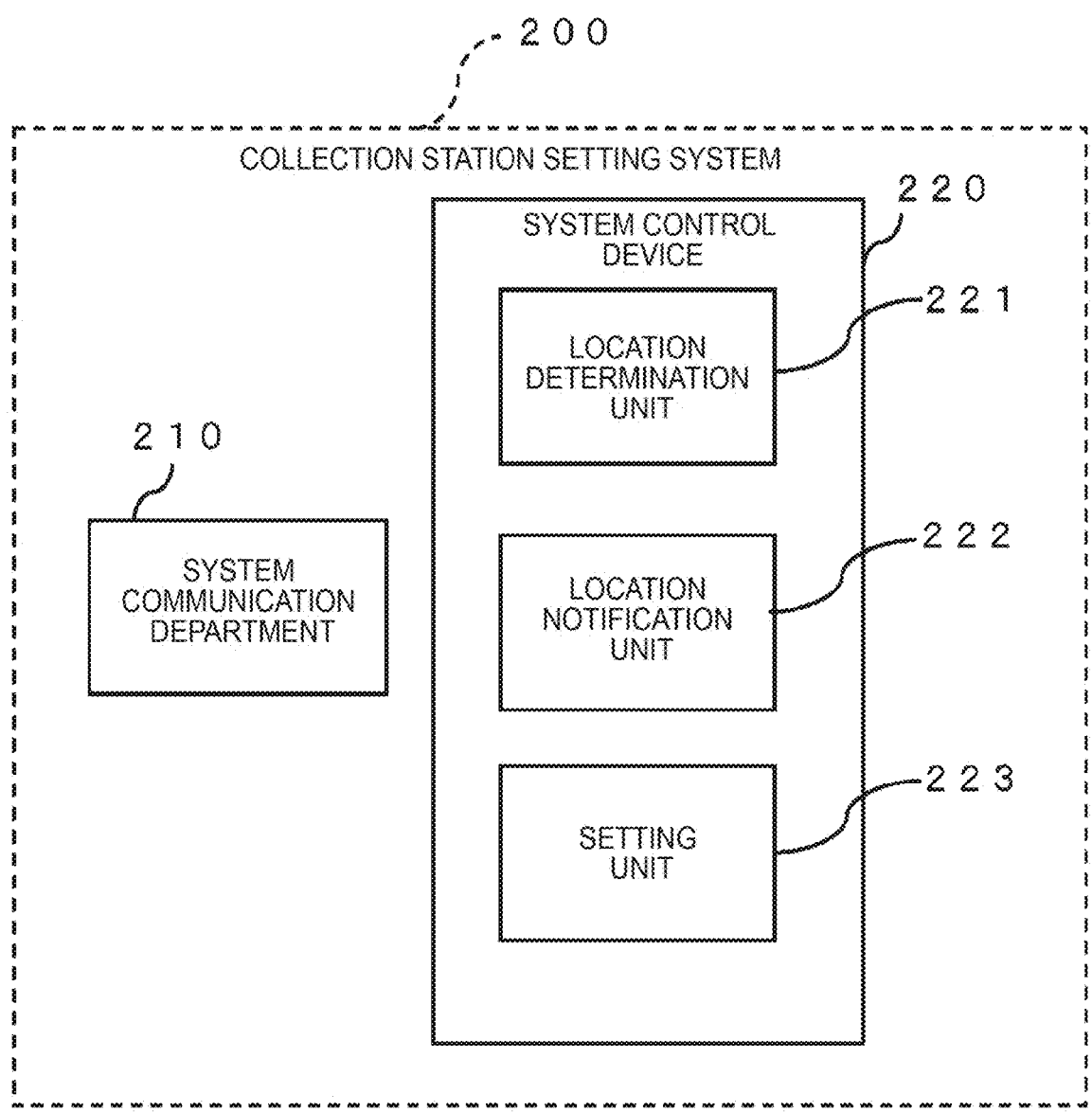
FIG. 5 is a schematic configuration diagram illustrating an example of a collection station setting system.

As illustrated in FIG. 5, the collection station setting system 200 includes, for example, a system communication unit 210 and a system control device 220. The collection station setting system 200 may be provided in any equipment. The collection station setting system 200 may be configured such that, for example, the power generation floating body 100 of any one of the plurality of power generation floating bodies 100 functions as the collection station setting system 200. Alternatively, the collection station setting system 200 may be provided as a cloud computing service. Alternatively, the collection station setting system 200 may be provided on the collection station 300 side. Alternatively, the collection station setting system 200 may be provided in a distributed manner in a plurality of facilities (the power generation floating body 100 and/or the collection station 300 may be included) capable of data communication with each other. For example, a location determination unit 221, which will be described later, may be provided in the floating body control device 150 of the power generation floating body 100 as a parent base.

The system communication unit 210 enables wireless communication between the collection station setting system 200 and the outside. "External" means either inside or outside the energy collection location changing system 1. The "external" may include, for example, a provider of various kinds of information necessary for various kinds of processing in the power generation floating body 100, the collection station 300, and the collection station setting system 200. In the case where the collection station setting system 200 is provided in the collection station 300, the collection station setting system 200 and the collection station 300 may transmit and receive various kinds of information via, for example, a data path.

The system control device 220 controls various processes in the collection station setting system 200. For example, the system control device 220 may recognize the position of the power generation floating body 100 by appropriately acquiring the position from the power generation floating body 100 via the system communication unit 210. The system control device 220 may be configured as a control unit including, for example, a CPU and a storage device and an input/output interface required for the operation of CPU. The storage device may include, for example, ROM, RAM, data storage, and the like.

The system control device 220 may, for example, read a computer program stored in a ROM or data-storage. The system control device 220 may acquire (i.e., download) a computer program from a device (not shown) disposed outside the energy collection location changing system 1 via the system communication unit 210, and read the acquired computer program. The system control device 220 executes the read computer program. As a result, a logical functional block for controlling the collection station setting system 200 is realized in the system control device 220. FIG. 5 illustrates an example of logical functional blocks implemented in the system control device 220. In the example illustrated in FIG. 5, a location determination unit 221, a location notification unit 222, and a setting unit 223 are implemented in the system control device 220.

The location determination unit 221 may be configured, for example, to determine a recovery position 300P in which the collection station 300 is to be provided. For example, the location notification unit 222 may be configured to notify at least a part of the power generation floating body 100 of the determined recovery position 300P. For example, the location notification unit 222 may notify the power generation floating body 100 of the recovery target of the determined recovery position 300P. The setting unit 223 performs a process for providing the collection station 300 at the determined collection position 300P. For example, when the collection station 300 is movable, the setting unit 223 may perform a process for guiding the collection station 300 to the collection position 300P. For example, the setting unit 223 may notify the collection station 300 to move to the collection position 300P. For example, the setting unit 223 may remotely guide the collection station 300 to the recovery position 300P.

For example, the system control device 220 may acquire the position of the power generation floating body 100 from the power generation floating body 100 as necessary. For example, the system control device 220 may appropriately acquire the position of its own base transmitted from the power generation floating body 100 via the system communication unit 210.

Processing in an Energy Collection Location Changing System

Processing performed by the energy collection location changing system 1 in order to recover the generated energy will be described with reference to FIGS. 6 and 7. Hereinafter, an embodiment of the power generation energy recovered from the power generation floating body 100 to the collection station 300 will be described as a hydrogen storage alloy tank. Further, the collection station 300 is described as a recovery vessel, and the recovery position 300P is described as a position at which the recovery vessel arrives. Note that various operations of the collection station setting system 200 are operations controlled by the system control device 220. Various operations of the power generation floating body 100 are operations controlled by the floating body control device 150.

First, the collection station setting system 200 performs a collection position determination process (S10). The collection station setting system 200 may perform a collection station position determination process according to, for example, a timing at which the recovery vessel arrives for power generation energy recovery. Alternatively, the collection station setting system 200 may perform the collection station position determination process at predetermined time intervals. In the present embodiment, since the collection station 300 is a recovery vessel, in the recovery position determination process of the present embodiment, the recovery position 300P at which the recovery vessel should arrive may be determined.

An example of a process performed in the collection position determination process will be described with reference to FIG. 7. In the collection station determination process, the collection station setting system 200 may first perform a storage rate determination process (S11), for example. In the storage rate determination process, the collection station setting system 200 may acquire the storage rate of the power generation floating body 100 from each power generation floating body 100. Alternatively, the collection station setting system 200 may acquire the storage amount from each of the power generation floating bodies 100 and calculate a storage rate with respect to the acquired storage amount. The collection station setting system 200 may, for example, identify the power generation floating body 100 having a storage rate equal to or greater than a predetermined collection standard as the high storage rate floating body 100. The collection station setting system 200 may distribute the power generation floating body group PG to three or more stages, high, medium, and low, based on, for example, storage rates. The recovery criterion may be, for example, a criterion indicating that the stored power generation energy has reached an amount to be recovered. The recovery criterion may be set dynamically or fixedly.

Next, the collection station setting system 200 may perform a wind condition determination process (S12). In the wind condition determination process, the collection station setting system 200 may acquire, for example, wind condition information of a predetermined range including the power generation floating body group PG (hereinafter, referred to as "around the power generation floating body") from a provider of the predetermined wind condition information. The "predetermined range" may be set as appropriate, for example, a range in which the power generation floating body group PG is movable. The "wind condition information" may include information on the state of the wind. The "wind condition information" may include, for example, information on wind power (including wind speed and wind volume such as average wind speed and instantaneous wind speed), wind direction, and the like. At least a portion of the "wind condition information" may be provided as a wind condition map. The "source of wind condition information" may include, for example, at least one of a government agency, a public agency, and a private agency that services the provision of wind condition information for a fee or free of charge.

The collection station setting system 200 may identify a faulty wind region and a faulty wind region around the power generation floating body, for example, based on the acquired wind condition information. The "good wind region" is, for example, a region where wind suitable for wind power generation by the power generation floating body 100 is blown. The "good wind region" may be, for example, a region where a strong wind with wind power is blowing, in which sufficient power generation energy is obtained by wind power generation. The "defective wind region" is a region in which wind is blown, which is not suitable for wind power generation by the power generation floating body 100. The "bad wind region" may be, for example, a region where wind is blowing less than the wind that is blowing in the "good wind region".

Subsequently, the collection station setting system 200 may perform a collection target specifying process (S13). In the recovery target specifying process, the collection station setting system 200 may specify the collection target power generation floating body 100 from the power generation floating body group PG based on, for example, the determination result of the storage rate determination process (S11) and the determination result of the wind condition determination process (S12). The collection station setting system 200 may specify, for example, the power generation floating body 100 in the good wind region and identified as the high storage rate floating body as the collection target.

When the power generation floating body 100 (hereinafter, referred to as "collection target floating body 100") as a collection target is identified, the collection station setting system 200 may perform, for example, a position determination process (S14). In the position determination process, the collection station setting system 200 may determine the collection position 300P based on the positions of all the collection target floating bodies 100. For example, the collection station setting system 200 may determine the collection position 300P such that the total distance from all the collection target floating bodies 100 to the collection position 300P is minimized. This makes it possible to empty the storage state of the power generation energy in the power generation floating body 100 in the good wind region and cause the power generation floating body 100 to continue the power generation as soon as possible. Therefore, it is possible to suppress the recovery of the power generation energy from hindering the power generation efficiency while increasing the recovery efficiency.

Figure 8:
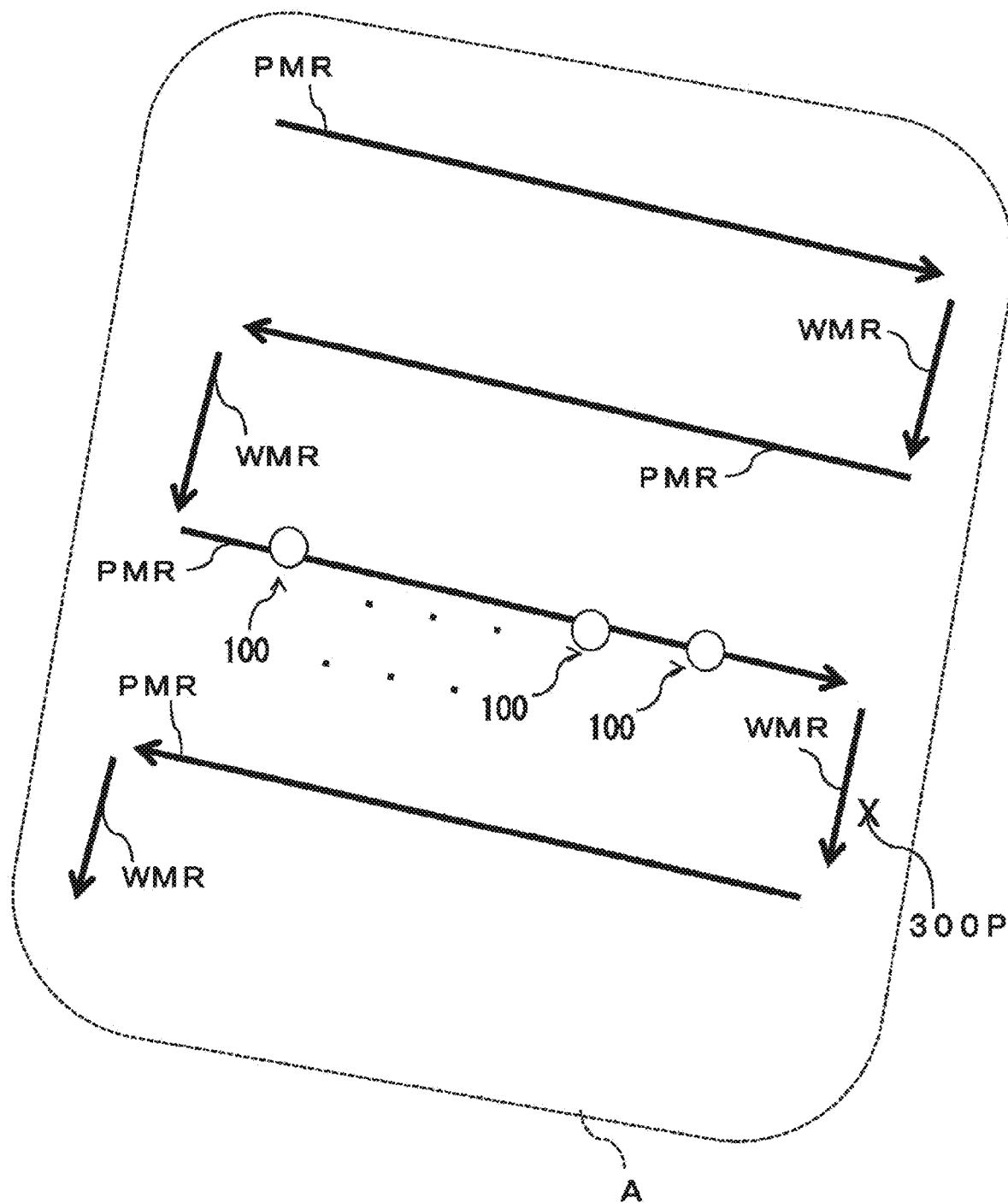
FIG. 8 illustrates an embodiment in which the retrieval position has been determined in the route shown in FIG. 3B.

When the power generation floating body group PG moves on the route shown in FIG. 3B, the collection station setting system 200 may determine, in the wind condition determination process (S12), the region A including, for example, the power generation mode route PMR and the collection mode route WMR as the good wind region, and determine the region outside the region A as the bad wind region. In the collection target specifying process (S13), the collection station setting system 200 may identify the high storage rate floating body 100 in the region A as a collection target. In the position determination process (S14), for example, as shown in FIG. 8, the collection station setting system 200 may determine the recovery position 300P at a position (hereinafter, referred to as "vicinity of the shortest collection mode route") in the collection mode route WMR that is closest to the collection mode route WMR having the shortest distance from the collection target floating body 100. When there is a relative difference in the wind force of the natural wind W in the region A, the collection station setting system 200 may determine, for example, a region where the wind force is relatively strong as a good wind region in the wind condition determination process (S12). In the subsequent collection target specifying process (S13), the collection station setting system 200 may specify the high storage rate floating body 100 in the good wind region as a collection target, as described above. In the position determination process (S14), the collection station setting system 200 may determine the collection position 300P, for example, in the good wind region, near the shortest collection-mode route.

When the collection position determination process is completed (that is, when the collection position 300P is determined), the collection station setting system 200 may return to FIG. 6 to perform a collection position notification process (S20), for example. In the collection location notification process, the collection station setting system 200 may notify the collection target floating body 100 of the location information indicating the determined collection location 300P, for example. Subsequently, the collection station setting system 200 may perform, for example, a collection station guidance process (S30). In the collection station guidance process, the collection station setting system 200 may, for example, notify the collection vessel of the determined collection position 300P. The collection station setting system 200 may, for example, guide the collection vessel to allow the collection vessel to arrive at the determined collection location 300P. The recovery vessel that has received the recovery position 300P may, for example, move to the recovery position 300P and wait for the arrival of the power generation floating body 100 as the collection station 300 at the recovery position 300P.

On the other hand, the power generation floating body 100 that has received the position information of the recovery position 300P may move to the recovery position 300P in which the recovery vessel stands by (S40). The power generation floating body 100 may recover the tether 112, for example, when moving to the recovery position 300P. For example, the power generation floating body 100 may operate the navigation mechanism 120 using electricity generated by its own power generation and move to the recovery position 300P. The power generation floating body 100 may move to the recovery position 300P by sailing using the sail 121 according to the wind condition. The recovery vessel may recover the hydrogen storage-alloy tank stored in the power generation storage mechanism 130 from the power generation floating body 100 that has reached the recovery vessel (S50). For example, the power generation floating body 100 may be replaced with a hydrogen storage alloy tank in which the power generation energy equal to or higher than the recovery standard is stored and a hydrogen storage alloy tank in which the power generation energy is empty. The process related to the replacement may be controlled by, for example, a control device of the recovery vessel.

Once the hydrogen-storage-alloy tank is collected on the recovery vessel, the power generation floating body 100 may, for example, S60 to a continuation position for continuing wind power generation. The continuation position may be, for example, the original position prior to moving to the retrieval position 300P. Alternatively, the continuation position may be other than the original position. As in the case of moving to the continuation position, the power generation floating body 100 may operate the navigation mechanism 120 by using, for example, electricity generated by its own power source, as in the case of moving S40. The power generation floating body 100 may move to the continuation position by sailing using the sail 121 according to the wind condition. In the continuation position, the power generation floating body 100 may unwind the tether 112 to resume wind power generation.

As described above, when the power generation floating body group PG moves in the route shown in FIG. 3B, the recovery position 300P (FIG. 8) may be determined to be near the shortest recovery-mode route. In this instance, the power generation floating body 100 moving in the collection mode route WMR may move (S40) to the recovery vessel waiting at the recovery position 300P in the vicinity of the shortest collection mode route to perform a recovery operation (S50). The power generation floating body 100 may then S50 to a continuation position on the original collection mode route WMR and continue power generation in a subsequent power generation mode route PMR. In the collection mode route WMR, the tether 112 is in a recovered state, so that the power generation floating body 100 does not need to recover the tether 112 for transfer to the recovery position 300P. As described above, by providing the recovery position 300P in the vicinity of the shortest recovery-mode navigation path in the good wind region, it is possible to smoothly and efficiently recover the generated power, and it is possible to prevent the recovery of the generated power from hindering the generation efficiency.

Modification of the First Embodiment

In S12 of the recovery position determination process (FIG. 7), the collection station setting system 200 may perform the sea condition determination process in place of or in addition to the wind condition determination process. In the sea condition determination process, the collection station setting system 200 may acquire, for example, the sea condition information around the power generation floating body from the provider of the predetermined sea condition information. The "sea condition information" may include information on the condition of the sea. The "sea condition information" may include, for example, information on a current condition, a wave condition, and the like. At least a portion of the "sea condition information" may be provided as a sea condition map. The "source of sea status information" may include, for example, at least one of a government agency, a public agency, and a private agency that services the provision of sea status information for a fee or free. The collection station setting system 200 may identify a defective wave region and a defective wave region in the vicinity of the power generation floating body, for example, based on the acquired sea condition information.

The "good wave region" may be, for example, a region in which the wave state does not interfere with the movement of the power generation floating body 100. The "defective wave region" may be, for example, a region in which a rough wave that hinders the movement of the power generation floating body 100 stands. In the recovery target specifying process (FIG. 7: S13), the collection station setting system 200 may specify, for example, the power generation floating body 100 in the good wave region and specified as the high storage rate floating body as the recovery target. In the recovery target specifying process (FIG. 7: S13), the collection station setting system 200 may specify, for example, the power generation floating body 100 in the good wind region and in the good wave region and specified as the high storage rate floating body as the recovery target.

In addition, in the recovery position determination process (FIG. 7) according to the first embodiment including the above-described modification, the collection station setting system 200 does not need to perform the storage rate determination process (S11). In this case, the collection station setting system 200 may identify the collection target floating body 100 from the power generation floating body group PG based on the determination result of the wind condition determination process and/or only the determination result of the sea condition determination process in the collection target specifying process (S13). For example, the collection station setting system 200 may identify the power generation floating body 100 in the good wind region and/or the good wave region as the collection target floating body 100 in the collection target specifying process (S13). As described above, the collection station setting system 200 may determine the recovery position 300P based on at least one of the wind condition and the sea condition in the vicinity of the power generation floating body, regardless of the storage rates of the power generation floating bodies 100.

2. Second Embodiment

In the description of the second embodiment, portions different from those of the first embodiment described above are mainly described, and description of portions overlapping with those of the first embodiment is omitted as appropriate. In the following description, elements similar to those of the first embodiment will be described with the same reference numerals.

Figure 9:
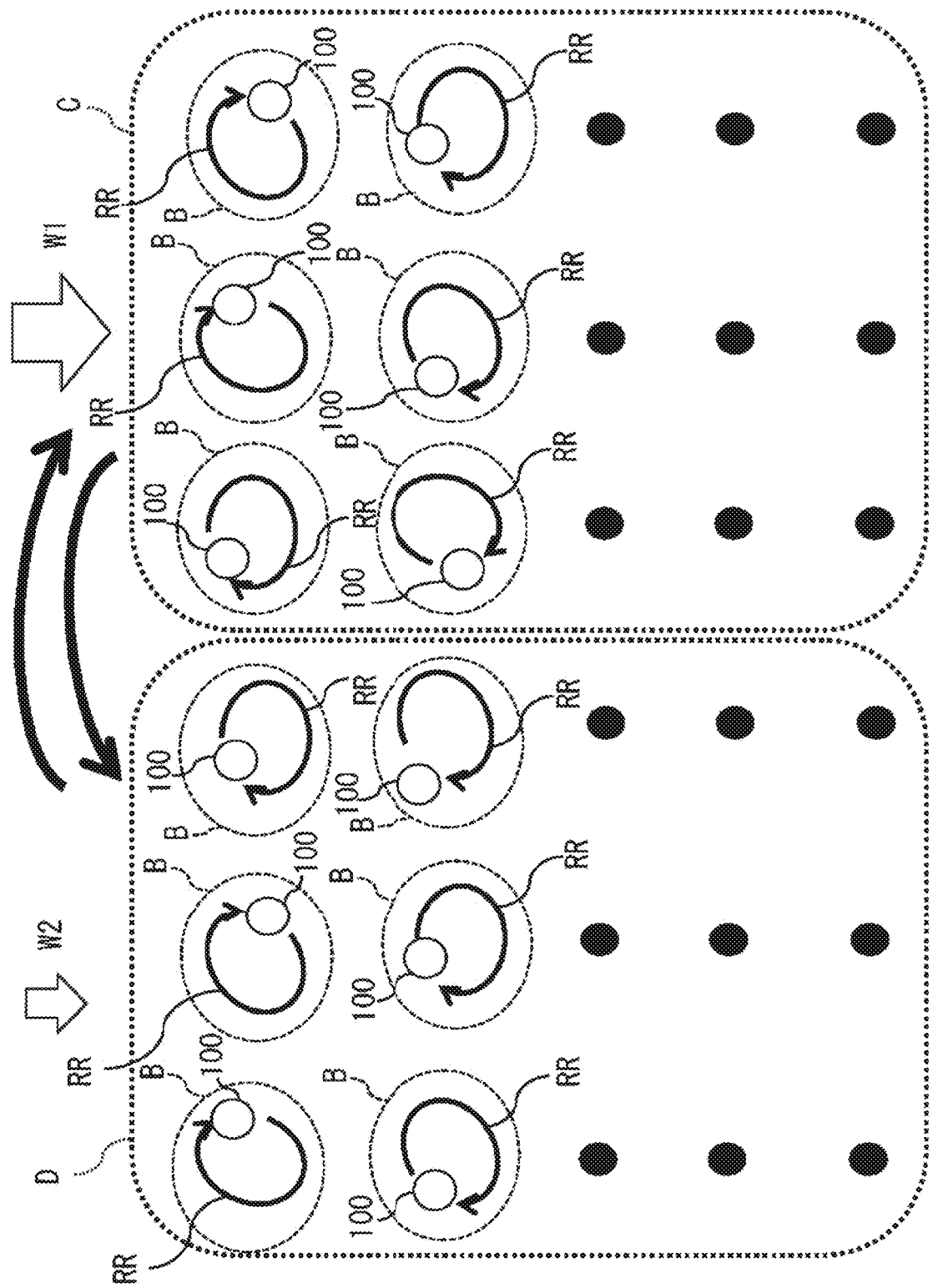
FIG. 9 is a diagram illustrating an example of a route of the power generation floating body according to the second embodiment.

The route of the power generation floating body 100 is not limited to the route shown in FIG. 3A and FIG. 3B, and any route may be adopted as appropriate. For example, as illustrated in FIG. 9, the power generation floating body 100 may generate electric power while moving a substantially circular route (hereinafter, referred to as "circular route RR"). A situation in which power is generated while moving in the circular route RR illustrated in FIG. 9 will be described as a second embodiment. In the example illustrated in FIG. 9, each power generation floating body 100 is moved so as to repeatedly draw a substantially circular shape in the region B of its own base in a state of being spaced apart from each other by a predetermined distance. With respect to the power generation floating body 100 moving in the circular route RR, a power generation mode PM for performing wind power generation by the kite 111 and a recovery mode WM for recovering the tether 112 may be switched at appropriate timings. The route of the power generation floating body 100 in the region B may be an eight-shaped route shown in FIG. 3A. The configuration of the collection station setting system 200 and the configuration of the power generation floating body 100 may be the same as those of the first embodiment. Hereinafter, in the processing in the energy collection location changing system 1, the description of the same parts as those of the first embodiment will be omitted, and parts different from those of the first embodiment will be described.

Figure 10:
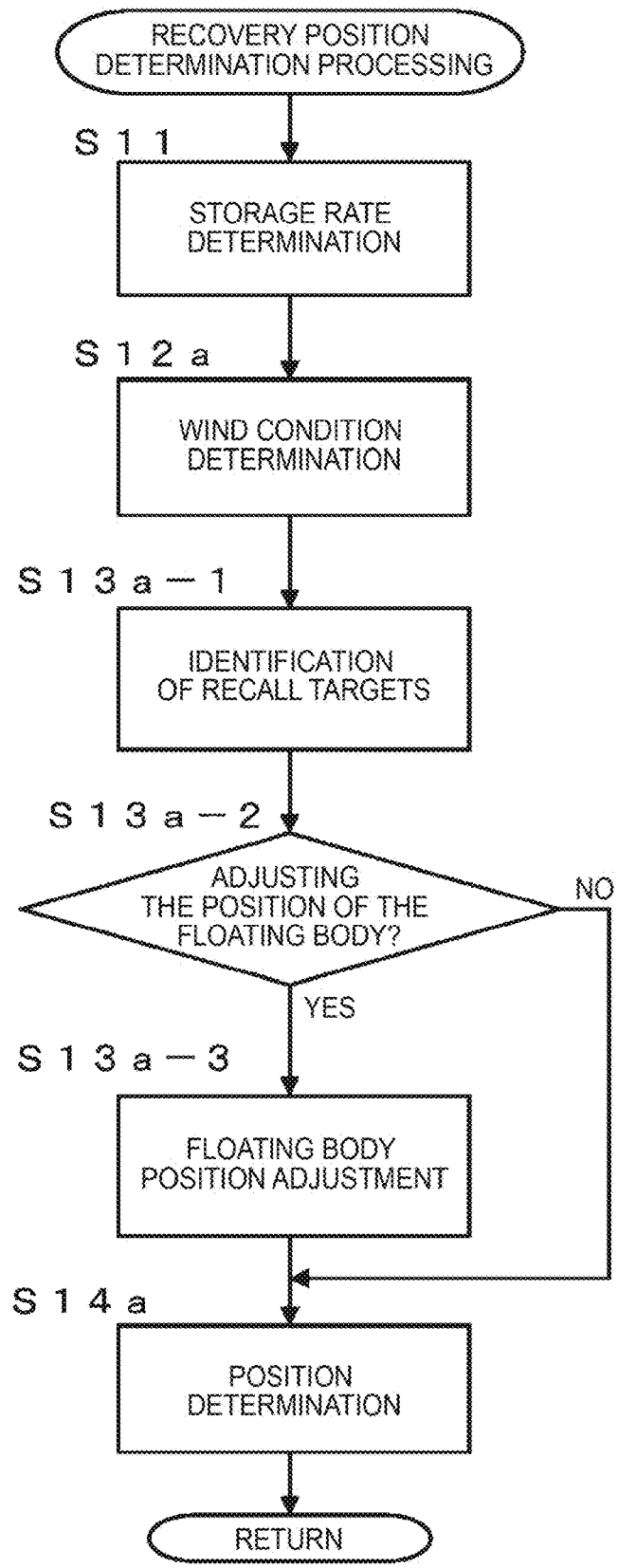
FIG. 10 is a flowchart illustrating an example of a recovery position determination process according to the second embodiment.

A recovery position determination process (S10 in FIG. 6) according to the second embodiment will be described with reference to FIG. 10. The storage rate determination process (S11) may be the same process as that of the first embodiment. In the wind condition determination process (S12a), when there is a weakness in the wind force of the natural wind W blowing against the power generation floating body group PG (for example, when the wind force of the natural wind W1 is larger than the wind force of the natural wind W2), the collection station setting system 200 may determine the strong wind region C and the weak wind region D as illustrated in FIG. 9.

In the collection target specifying process (S13a-1), the collection station setting system 200 may specify the collection target floating body 100 from the power generation floating body group PG based on the determination result of the storage rate determination process (S11) and the determination result of the wind condition determination process (S12a). The collection station setting system 200 may specify, for example, the power generation floating body 100 in the strong wind region C and identified as the high storage rate floating body as the recovery target.

When the collection target floating body 100 is identified, the collection station setting system 200 may determine, for example, whether to adjust the position of the power generation floating body 100 (S13a-2). The collection station setting system 200 may determine that the position adjustment is to be performed, for example, when the low storage rate floating body 100 is in the weak wind region D. The low storage rate floating body 100 may be, for example, a power generation floating body 100 having a storage rate less than a recovery standard. As the low storage rate floating body 100, for example, a power generation floating body 100 having a medium storage rate (for example, a storage rate that is less than the recovery standard and is equal to or higher than a predetermined minimum standard) may be selected. If an affirmative determination is made in S13a-2 (S13a-2: YES), the collection station setting system 200 may proceed to a floating body position adjusting process (S13a-3). If a negative determination is made in S13a-2 (S13a-2: NO), the collection station setting system 200 may skip the floating body position adjusting process (S13a-3) and proceed to the position determination process (S14a).

In the floating body position adjusting process (S13a-3), for example, the collection station setting system 200 may move the collection target floating body 100 in the strong wind region C to the weak wind region D and move the low storage rate floating body 100 in the weak wind region D to the strong wind region C. The collection station setting system 200 may issue a movement command to the weak wind region D to the collection target floating body 100, and issue a movement command to the strong wind region C to the low storage rate floating body 100 in the weak wind region D, for example. In the floating body position adjustment process, each moving power generation floating body 100 may recover the tether 112 when moving. The method of moving the power generation floating bodies 100 in the floating body position adjusting process may be the same as the method of moving in the above-described S40 (FIG. 6). The low storage rate floating body 100 that has moved to the strong wind region C may, for example, pay out the tethers 112 at a predetermined distance from each other, and resume the wind power generation while moving in the circular route RR. After the floating body position adjusting process, the collection station setting system 200 may proceed to a position determination process (S14a).

In the position determination process (S14a), the collection station setting system 200 may determine the collection position 300P based on the positions of all the collection target floating bodies 100. For example, the collection station setting system 200 may determine the collection position 300P such that the total distance from all the collection target floating bodies 100 to the collection position 300P is minimized. When the floating body position adjusting process (S13a-3) is executed, the collection station setting system 200 may determine the collection position 300P based on the positions of all the collection target floating bodies 100 that have moved to the weak wind region D. For example, the collection station setting system 200 may determine the collection position 300P such that the total distance from all the collection target floating bodies 100 to the collection position 300P in the weak wind region D is minimized.

Referring back to FIGS. 6, S20 to S50 in the second embodiment may be the same as that in the first embodiment. The "continuation position" of S60 in the second embodiment may be, for example, a position in the weak wind region D. Accordingly, the power generation floating body 100 from which the power generation energy has been recovered may return to the weak wind region D and continue the wind power generation. As described above, according to the energy collection location changing system 1 of the second embodiment, since the high storage rate floating body 100 in the strong wind region C is a recovery target and the low storage rate floating body 100 in the weak wind region D is moved to the strong wind region C, it is possible to promote an increase in the power generation amount in the low storage rate floating body 100. Therefore, the power generation floating body group PG can generate the power generation energy by effectively utilizing the wind in the strong wind region C. Therefore, it is possible to suppress the recovery of the power generation energy from hindering the power generation efficiency.

3. Third Embodiment

In the description of the third embodiment, portions different from those of the first embodiment described above are mainly described, and description of portions overlapping with those of the first embodiment is omitted as appropriate. In the following description, elements similar to those of the first embodiment will be described with the same reference numerals.

Figure 11:
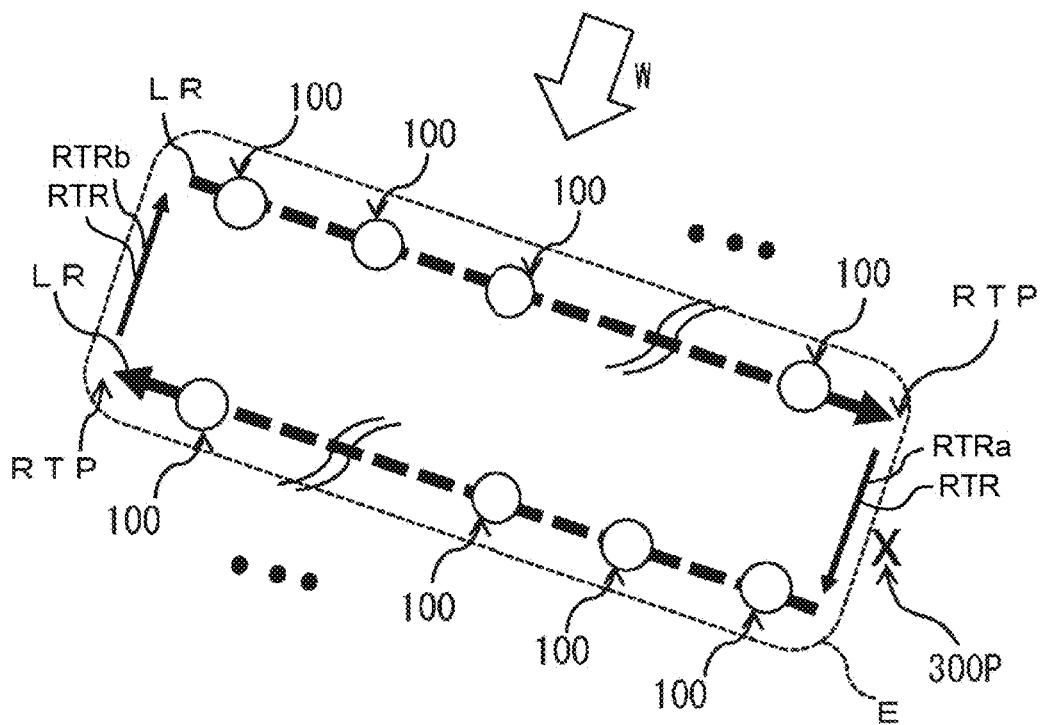
FIG. 11 is a diagram illustrating an exemplary route of the power generation floating body according to the third embodiment.
Figure 12:
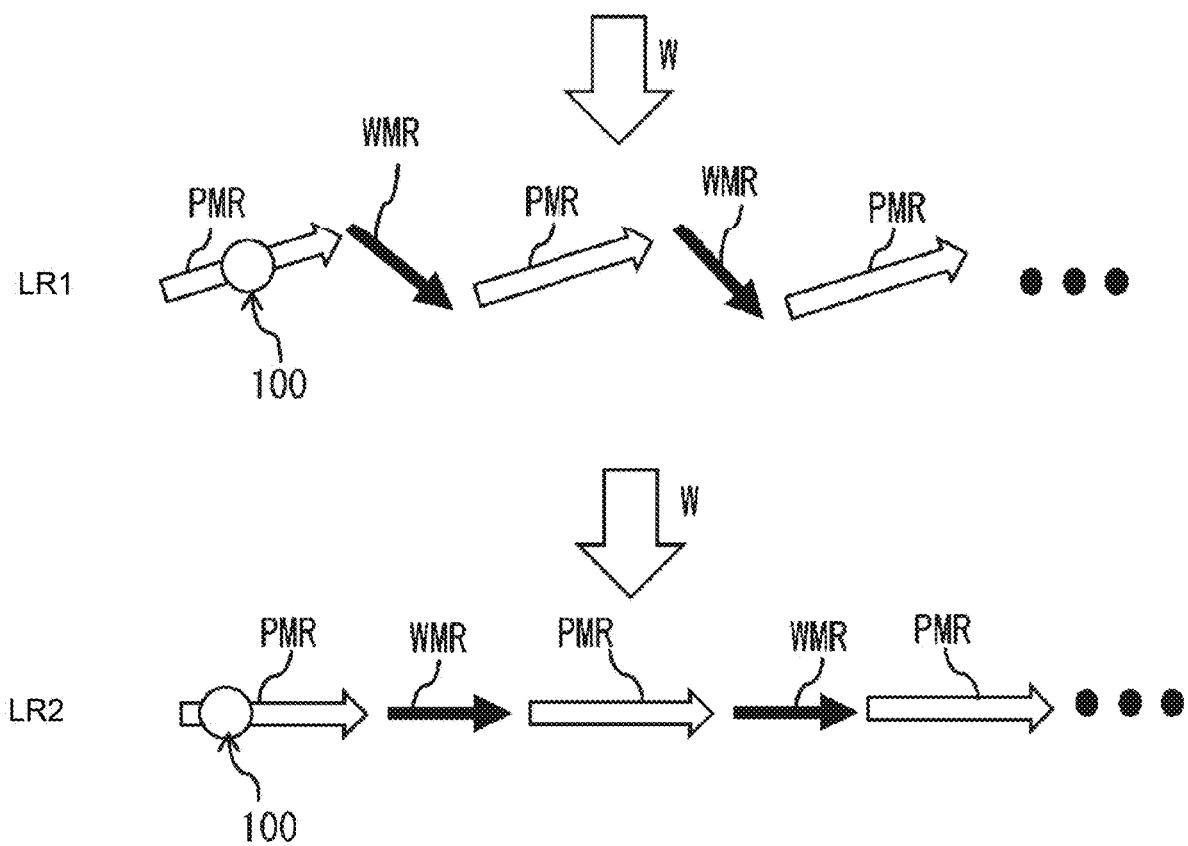
FIG. 12 is a view showing details of the straight route shown in FIG. 11.

Further examples of the route of the power generation floating body 100 will be described with reference to FIG. 11 and FIG. 12. As illustrated in FIG. 11, the navigation unit 152 may set the route of the power generation floating body 100 such that the straight route LR and the return route RTR are repeated in the predetermined region E. The power generation floating body 100 may navigate in the region E so as to repeatedly draw a substantially quadrangular shape having the straight route LR as a longitudinal direction and the return route RTR as a lateral direction. The region E may be determined statically or dynamically, for example, due to natural environmental limitations such as wind conditions or social limitations such as territorial waters. The straight route LR is basically a route that is set so that the power generation floating body 100 travels in a direction perpendicular to the natural wind W (that is, in a substantially linear shape while receiving the natural wind W laterally). In the embodiment of FIG. 11, a plurality of power generation floating bodies 100 are navigated on the same straight route LR. The respective power generation floating bodies 100 on the straight route LR may be steered by the navigation unit 152 so as to be navigated while securing a distance such that the upper kites 111 are not entangled with each other, for example.

In the straight route LR, the power generation mode route PMR and the collection mode route WMR may be alternately repeated. Aspects of the straight route LR may include, for example, a zigzag route LR1 and an abeam route LR2, as shown in FIG. 12. The zigzag route LR1 may be set such that the power generation floating body 100 repeatedly moves the power generation mode route PMR and the collection mode route WMR in a zigzag manner while receiving the natural wind W from substantially the side. The abeam Route LR2 may be set such that the power generation floating body 100 repeatedly moves the power generation mode route PMR and the collection mode route WMR in a substantially linear manner. In the abeam route LR2, the power generation floating body 100 may proceed while maintaining a so-called abeam (i.e., crosswind) condition with respect to the natural wind W.

On the other hand, the return route RTR may be set to the return-point RTP at which the power generation floating body 100 should be turned. The distance and the traveling direction of the return route RTR may be set so that a safe distance between the power generation floating bodies 100 moving in the straight route LR is ensured with respect to the vertical direction of the wind direction. Therefore, as shown in FIG. 11, the return route RTR may include a return route RTRa in which the power generation floating body 100 travels downward in the wind direction of the natural wind W and a return route RTRb in which the power generation floating body travels upward in the wind direction. In addition, the distance of the return route RTR may be much shorter than the distance of the straight route LR if the safety distance is ensured. For example, the straight route LR may be on the order of 10 to 80 km, while the return route RTR may be on the order of 2 to 3 km. In the return route RTR, the power generation floating body 100 may have the tether 112 recovered, for example. The power generation floating body 100 may move the return route RTR by operating the motor 124 or the like by using electricity generated by its own power generation. In the return route RTR, the power generation floating body 100 may sail when it is capable of sailing in accordance with wind conditions or the like.

The operation of the collection station setting system 200 and the operation of the power generation floating body 100 in the third embodiment will be described with reference to FIG. 6 and FIG. 7. First, a collection position determination process (FIG. 6: S10, FIG. 7) performed by the collection station setting system 200 will be described. In the storage rate determination process (S11), the collection station setting system 200 may determine the high storage rate floating body 100, for example, in the same manner as in the first embodiment. The collection station setting system 200 may determine the wind direction of the region E in the wind condition determination process (S12), for example, based on the wind condition data. In the collection target specifying process (S13), the collection station setting system 200 may set, for example, a plurality of high storage rate floating bodies 100 moving on the same straight route LR as the collection target floating body 100. In the position determination process (S14), the collection station setting system 200 may determine, for example, a return point RTP and a return route RTR at which the collection target floating body 100 on the straight route LR returns based on the wind direction. For example, the collection station setting system 200 may determine the recovery position 300P so that the power generation energy (i.e., the hydrogen storage alloy tank) is recovered in the return route RTR in which the traveling direction is the wind downward direction. FIG. 11 shows a state in which the recovery position 300P is determined in the vicinity of the return route RTRa (a position close to the return route RTRa) in which the traveling direction is the wind downward direction.

When the collection is performed irrespective of the storage rate, the collection station setting system 200 does not need to perform the storage rate determination process (S11). In addition, instead of the storage rate determination process (S11), the collection station setting system 200 may determine the air volume of the region E based on the wind condition information in the wind condition determination process (S12). The collection station setting system 200 may determine that the region E is a high air volume, for example, when the air volume in the region E is equal to or greater than the amount of power generation satisfying the recovery criterion. Then, in the collection target specifying process (S13), the collection station setting system 200 may specify the power generation floating body 100 in the region E determined to be the high air volume as the collection target floating body 100. In the position determination process (S14), the collection station setting system 200 may determine a return point RTP and a return route RTR at which the identified collection target floating body 100 returns based on the wind direction, for example. For example, the collection station setting system 200 may determine the recovery position 300P so that the power generation energy (i.e., the hydrogen storage alloy tank) is recovered in the return route RTRa in which the traveling direction is the wind downward direction. As described above, the recovery position 300P may be determined based on the wind direction and the air volume (power generation amount).

Figure 6:
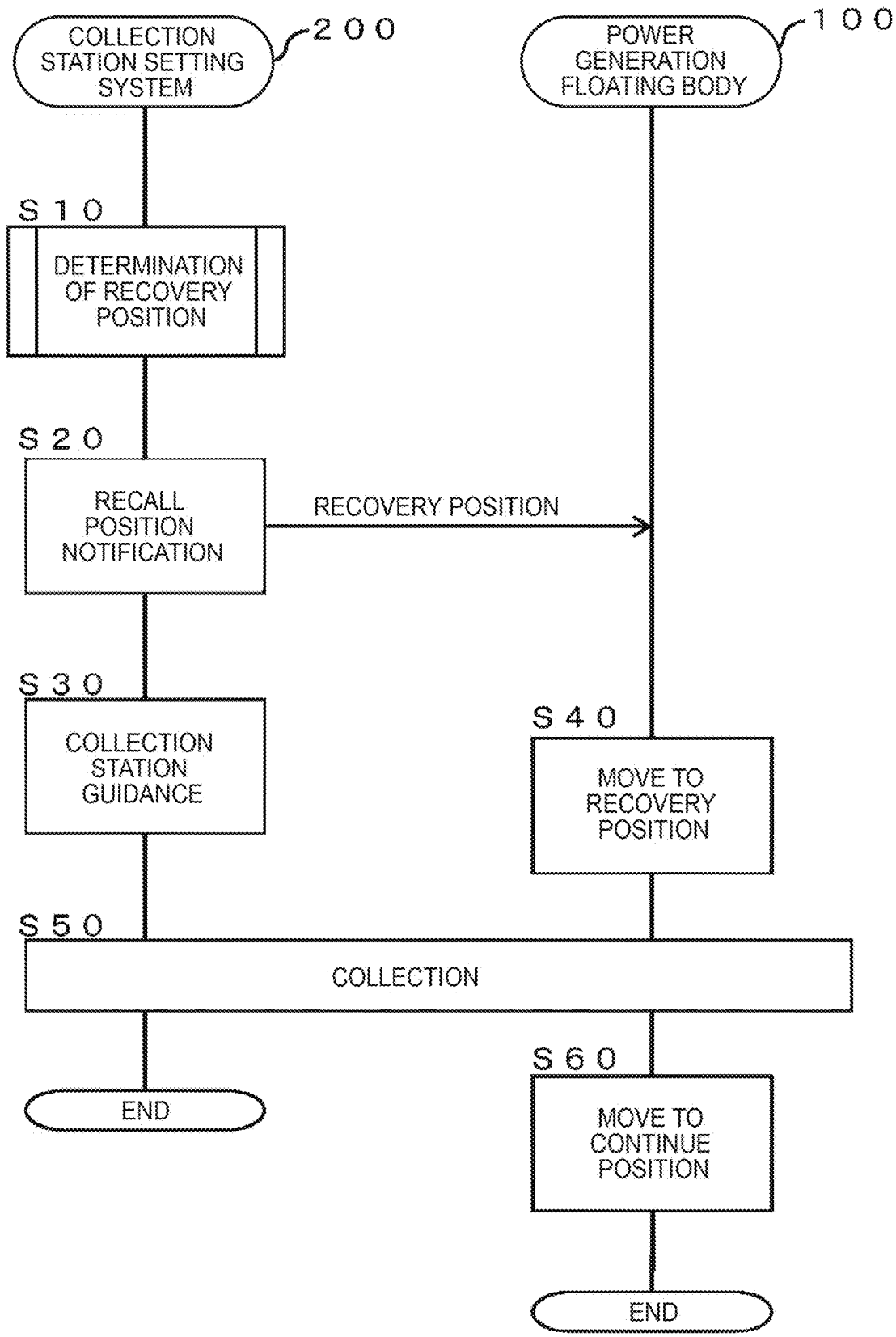
FIG. 6 is a sequence diagram illustrating an example of a process flow in an energy collection location changing system.
Figure 7:
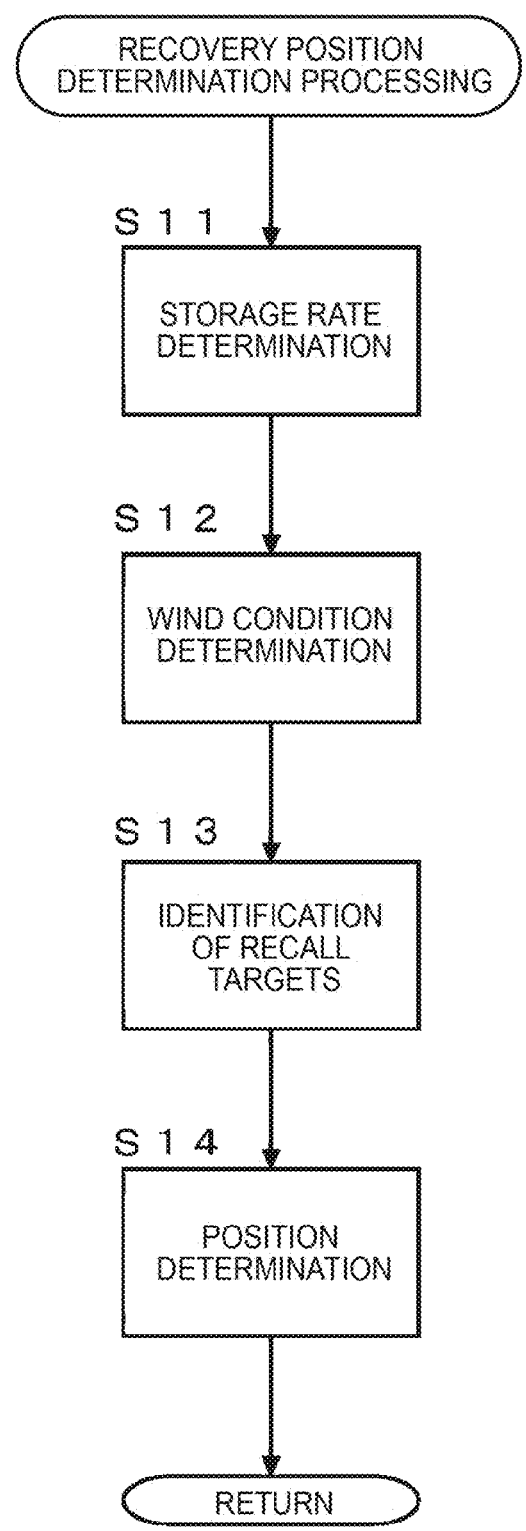
FIG. 7 is a flowchart illustrating an example of a recovery position determination process.

When the collection position determination process is completed (that is, when the collection position 300P is determined), the collection station setting system 200 may perform, for example, a collection position notification process (FIG. 6: S20). In the collection position notification process, the position information indicating the collection position 300P may be notified to the collection target floating body 100. In the collection station guidance process (FIG. 6: S30), the collection station setting system 200 may, for example, notify the collection vessel of the determined collection position 300P.

The power generation floating body 100 that has received the position information of the recovery position 300P may approach the recovery position 300P after entering the return route RTRa (FIG. 6: S40). The method of moving to the recovery position 300P may be the same as the method of moving in the return route RTRa. In S50 (FIG. 6), a recovery process similar to that of the first embodiment may be performed. When the power generation energy (e.g., hydrogen storage alloy tank) is collected in the collection vessel as the collection station 300, the power generation floating body 100 may return to the continuation position (FIG. 6: S60), for example. The continuation position may be, for example, any position on the return route RTR. The continuation position may be, for example, an original position prior to the power generation floating body 100 moving to the recovery position 300P. The continuation position may be the starting position of the straight route LR to proceed next. The method of moving to the continuation position may be the same as the method of moving in S40 (FIG. 6).

3. Other Embodiments

In the energy collection location changing system 1, a plurality of recovery position 300P may be provided. That is, one recovery position 300P may be associated with each of a predetermined number (or a predetermined range) of power generation floating body groups in the power generation floating body group PG. Here, for example, the above-described processes may be performed on the respective collection position 300P.

The mode of the stored power generation energy is not limited to the hydrogen storage alloy. For example, the power generation energy may be stored as liquefied hydrogen or compressed hydrogen. Alternatively, the power generation may be stored in a converted manner into a hydrogen-containing material, such as methylcyclohexane (MCH). Further, the power generation energy may be stored in a manner in which hydrogen is not utilized. For example, the generated energy may be stored in a storage battery. The power generation floating body 100 is not limited to a sail-type floating body using wind energy. The power generation floating body 100 may be configured to move without using wind energy, for example, using an engine using gasoline, diesel, or the like, a motor using electricity, or the like as a power source.

The power generation in the power generation floating body 100 is not limited to wind power generation. For example, the power generation in the power generation floating body 100 may be ocean power generation using kinetic energy based on tidal current or ocean current. The power generation floating body 100 may include, for example, a propeller that is rotatable by ocean current, and may be configured such that power generation is performed by rotation of the propeller. The propeller used in power generation may be used, for example, to propel the power generation floating body 100. In addition, the power generation in the power generation floating body 100 may be photovoltaic power generation that generates power using solar energy. The power generation floating body 100 may include, for example, at least one solar panel that generates electricity by solar energy. The power generation using the renewable energy performed by the power generation floating body 100 may be performed in a state in which the power generation floating body 100 remains stationary without moving.

APPENDICES

With regard to the embodiments described above, the following additional notes are further disclosed.

Appendix 1

The energy collection location changing system described in Appendix 1, A power generation floating body configured to be capable of navigating a water surface and generating power using renewable energy; A collection station setting system for providing a collection station for recovering power generation energy from at least a part of a power generation floating body group composed of the power generation floating body is provided so as to be able to communicate with each other. The power generation floating body includes a power generation storage unit for storing the power generation energy in a predetermined storage mode, and a navigation unit for causing the power generation floating body to navigate to a predetermined destination. The collection station setting system includes a location determination unit for determining a recovery position on the basis of at least one of a wind condition and a sea condition in a predetermined region including the power generation floating body group, a location notification unit for notifying at least a part of the power generation floating body group of position information indicating the determined recovery position, and setting unit for providing the collection station at the determined collection location. When the position information is acquired, the navigation unit of the power generation floating body causes the vehicle to navigate to the determined recovery position.

According to the energy collection location changing system described in Appendix 1, a recovery position is determined with respect to a power generation floating body group that generates electric power using renewable energy on water, and a collection station is set at the recovery position. Therefore, the recovery vessel that recovers and transfers the power generation energy can recover the power generation energy at the collection station without turning each power generation floating body. That is, the recovery vessel does not need to recover the power generation energy around each power generation floating body. Therefore, the energy collection location changing system can provide efficient energy recovery. In particular, the present disclosure is effective in a case where a large number of power generation floating bodies constitute a group of power generation floating bodies in a large area such as the sea. Further, the recovery position is determined based on at least one of wind conditions and sea conditions. The wind condition is, for example, a state of wind such as a wind direction and a wind speed (wind force). The sea state is, for example, a sea current state, a wave state, or the like. Therefore, according to the present disclosure, depending on the state of the wind and/or the state of the sea at the time of recovery, it is possible to change the recovery position to a position convenient for recovery. For example, a position at which the power generation floating body is easily moved to the collection station may be set as the recovery position based on the wind condition and/or the sea condition. Thus, more efficient energy recovery can be realized.

Appendix 2

The energy collection location changing system according to Appendix 2 is the energy collection location changing system according to Appendix 1, wherein the collection station setting system is provided on a power generation floating body of any one of the power generation floating body groups.

According to the energy collection location changing system described in Appendix 2, the power generation floating body of one of the power generation floating body groups can function as a parent base of the collection station setting system.

Appendix 3

The energy collection location changing system according to Appendix 3 is the energy collection location changing system according to Appendix 11 or 2, wherein the location determination unit of the collection station setting system determines the recovery position based on at least one of the wind condition and the sea condition and a storage rate of the power generation energy in the power generation storage unit of each of the power generation floating bodies.

According to the energy collection location changing system described in Appendix 3, the recovery position can be determined in consideration of not only the wind condition and/or the sea condition but also the storage rate of each power generation floating body. For example, when power generation energy is recovered from a power generation floating body having a high storage rate, the amount of power generation energy recovered is also increased, so that more efficient energy recovery can be realized.

Appendix 4

The energy collection location changing system according to Appendix 4 is the energy collection location changing system according to any one of Appendices 1 to 3, wherein the collection station is configured to be movable, and the setting unit guides the collection station to the recovery position.

According to the energy collection location changing system described in Appendix 4, the collection station can be set to the recovery position by guiding the movable collection station to the determined recovery position.

Appendix 5

The energy collection location changing system according to Appendix 5, wherein the power generation floating body has a sail and a kite connected to a tether, and the navigation unit of the power generation floating body navigates itself based on the wind energy received by the sail, and the power generation floating body generates power using the wind energy received by the kite. The energy collection location changing system according to any one of Appendices 1 to 4, wherein the location determination unit determines a position where wind power is relatively large in the region as the recovery position.

According to the energy collection location changing system described in Appendix 5, when the power generation floating body moves using wind energy and generates power using wind energy, a position where wind power is relatively large in the region of the power generation floating body group is determined as the recovery position. In the region where the wind energy is large, the moving speed is high and the power generation amount is large, so that more efficient energy recovery can be realized.

The present disclosure can be modified as appropriate within the scope and spirit of the disclosure that can be read from the claims and the specification as a whole, and an energy collection location changing system accompanied by such a modification is also included in the technical idea of the present disclosure.

What is claimed is:

1. An energy collection location changing system comprising:
    a power generation floating body configured to navigate a water surface and generate electric power using renewable energy; and
    a collection station setting system configured to provide a collection station for collection of generated energy from at least part of a power generation floating body group including a plurality of the power generation floating bodies, wherein:
    the power generation floating body and the collection station setting system are configured to perform data communication with each other;
    the power generation floating body includes
        a hydrogen storage alloy tank that stores hydrogen as the generated energy by a predetermined storage method,
        a sail configured to receive wind and sail the power generation floating body,
        a rudder configured to determine a direction of the power generation floating body,
        a center board configured to generate a lateral force,
        a tether,
        a kite connected to the tether,
        a winch including a first rotating shaft and configured to unwind the tether from the winch in a case where the kite is raised, and
        a generator including a second rotating shaft connected to the first rotating shaft and configured to generate energy by the first rotating shaft and the second rotating shaft rotating in conjunction with each other while the kite is raised; and
    the collection station setting system is configured to
        acquire a wind condition and a sea condition from at least one of a government agency, a public agency, and a private agency, the wind condition including wind energy that includes wind speed and wind volume,
        determine whether the acquired wind energy is equal to or greater than a predetermined value,
        determine a collection location where the collection station is to be provided based on at least one of the wind condition and the sea condition in a predetermined region including the power generation floating body group,
        notify at least part of the plurality of power generation floating bodies about location information indicating the determined collection location, and
        move the collection station to the determined collection location, wherein
    the predetermined region includes a first region and a second region,
    the first region is a region that the wind energy is equal to or greater than the predetermined value,
    the second region is a region that the wind energy is less than the predetermined value,
    the power generation floating body is further configured to
        acquire the location information,
        navigate to the determined collection location based on wind energy received by the sail in a case where the power generation floating body acquires the location information,
        raise the kite to a predetermined height, and
        generate power using wind energy by raising the kite to the predetermined height, and
    the collection station setting system is further configured to
        acquire, from each of the plurality of power generation floating bodies, an amount of the hydrogen in the hydrogen storage alloy tank,
        determine a first group of power generation floating bodies out of the plurality of power generation floating bodies in the predetermined region, each of the power generation floating bodies included in the first group storing hydrogen at a hydrogen amount equal to or greater than a predetermined hydrogen amount, and
        designate an area encompassing the first group as the collection location.

2. The energy collection location changing system according to claim 1, wherein the collection station setting system is provided to any one of the power generation floating bodies in the power generation floating body group.

3. The energy collection location changing system according to claim 1, wherein the collection station setting system is further configured to guide the collection station to the collection location.

4. The energy collection location changing system according to claim 1, wherein:
    a route of the power generation floating body includes a first route and a second route;
    the power generation floating body is further configured to
        navigate on the first route in a case where the energy collection location changing system collects the generated energy from the power generation floating body, and
        navigate on the second route in a case where the power generation floating body generates the power; and
    a length of the second route is longer than a length of the first route.

5. The energy collection location changing system according to claim 1, wherein the collection station setting system is further configured to move a second group of power generation floating bodies out of the plurality of power generation floating bodies, each of the power generation floating bodies included in the first group storing hydrogen at a hydrogen amount that is less than the predetermined hydrogen amount to the first region and move the first group to the second region in a case where the second group is in the second region and the first group is in the first region.

6. The energy collection location changing system according to claim 4, wherein the power generation floating body is further configured to move to a starting point of the second route after the power generation floating body moves from the first route to the collection station and ends the collection of the generated energy at the collection station.

7. The energy collection location changing system according to claim 1, wherein the predetermined storage method is a method that water is decomposed by the generated energy into hydrogen and the hydrogen decomposed from water is absorbed in the hydrogen storage alloy tank.

8. The energy collection location changing system according to claim 4, wherein:
   the route includes a plurality of the first routes; and
   the collection station setting system is further configured to determine a location within a predetermined distance from a closest first route to any one of the power generation floating bodies included in the first group among the plurality of the first routes as the collection location.

9. The energy collection location changing system according to claim 5, wherein the collection station setting system is further configured to determine a third location as the collection location such that a total distance from all of the power generation floating bodies included in the first group to the collection location is minimized.

\* \* \* \* \*